(12) United States Patent
Wang

(10) Patent No.: US 8,019,398 B2
(45) Date of Patent: Sep. 13, 2011

(54) SLIDE MECHANISM AND SLIDE-TYPE PORTABLE TERMINAL DEVICE USING THE SAME

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 774 days.

(21) Appl. No.: 12/124,168

(22) Filed: May 21, 2008

(65) Prior Publication Data
US 2009/0156274 A1    Jun. 18, 2009

(30) Foreign Application Priority Data
Dec. 18, 2007    (CN) .......................... 2007 1 0203194

(51) Int. Cl.
*H04M 1/00*    (2006.01)

(52) U.S. Cl. .................................................... 455/575.4
(58) Field of Classification Search ................ 455/575.4
See application file for complete search history.

(56) References Cited

FOREIGN PATENT DOCUMENTS

| TW | M274725 | 9/2005 |
|----|---------|--------|
| TW | M306010 | 2/2007 |
| TW | M319591 | 9/2007 |

*Primary Examiner* — Duc Nguyen
*Assistant Examiner* — Ankur Jain
(74) *Attorney, Agent, or Firm* — Altis Law Group, Inc.

(57) ABSTRACT

An exemplary slide mechanism includes a main plate a slide plate, and two arched resilient members. The arched resilient members are disposed on the main plate. The slide plate is slidably laid over the main plate. A resisting member is fixed on one surface of the slide plate facing to the main plate. The resisting member keeps resisting the arched resilient members when the slide plate sliding along the main plate. A guiding surface is formed on the main plate. One end of each arched resilient member is fixed to the main plate, and the other end of each arched resilient member resists and is slidable on the guiding surface. A slide-type portable terminal device using the slide mechanism is also provided.

12 Claims, 9 Drawing Sheets

SLIDE MECHANISM AND SLIDE-TYPE PORTABLE TERMINAL DEVICE USING THE SAME

BACKGROUND

1. Field of the Invention

The present invention relates generally to slide mechanisms, and particularly to a slide-type portable terminal device using a slide mechanism.

2. Discussion of the Related Art

Currently, sliding-type portable terminal devices are becoming increasingly used. Most sliding-type portable terminal device are configured with a first housing, a second housing and a slide mechanism connecting the second housing with the first housing. A keypad is configured in the first housing, and a display is configured in the second housing. The second housing slides over the first housing via the slide mechanism, thereby opening/closing the portable terminal device.

Referring to FIGS. 8 and 9, a typical slide mechanism 100 includes a main plate 10 and a slide plate 20. The main plate 10 is fixed to the first housing and the slide plate 20 is fixed to the second housing of the sliding-type portable terminal device.

The main plate 10 is substantially rectangular shaped. The main plate 10 defines four first fixation holes 12 in four corners thereof correspondingly, for fixing the main plate 10 to the first housing 40. The main plate 10 has a substantially rectangular opening 14 in the middle. A length of each second side 144 is larger than that of each first side 142. The main plate 10 has two arched elastic strips 16 crossing the opening 14 and extending from one first side 142 to the other first side 142. The elastic strips 16 are symmetrically disposed and spaced by a distance in such a manner that a distance between them gradually increases from the middle to the ends. Thus, a guiding slot 162 is defined by the two elastic strips 16. The width of the guiding slot 162 gradually increases from the middle to the ends.

A length of the slide plate 20 is smaller than that of the main plate 10. The slide plate 20 is slidable relative to the main plate 10. The slide plate 20 is substantially rectangular shaped. The slide plate 20 has four second fixation holes 22 defined in four corners thereof, for fixing the slide plate 20 to the second housing. The slide plate 20 has a post 24 protruding from a center of the slide plate 20. The post 24 is received by and slidable in the guiding slot 162. A diameter of the post 24 is larger than a smallest width of the guiding slot 162, and is smaller than a largest width of the guiding slot 162.

In operating the slide mechanism 100, the slide plate 20 slides relative to the main plate 10 along a direction of the arrow shown in FIG. 2. Therefore, the post 24 of the slide plate 20 slides, relative to the main plate 10, in the guiding slot 162 of the main plate 10. Thus, the two elastic strips 16 of the main plate 10 deformed by the post 24, thereby accumulating elastic energy. When the post 24 reaches the middle of the guiding slot 162, the elastic strips 16 are at their most deformed position, thereby storing a maximum elastic energy. The slide plate 20 automatically slides under an elastic force of the elastic strips 16, immediately after the slide plate 20 passing the middle of the main plate 10. The second housings can slide over the first housing due to the slide plate 20 slides relative to the main plate 10.

However, when the slide plate 20 slides relative to the main plate 10, the arched elastic strips 16 are deformed by the post 24 of the slide plate 20 resulting in wear and tear. Thus, the elastic force of the elastic strips 16 may degrade. Therefore, a service life of the slide mechanism 100 is decreased.

Therefore, a slide mechanism and a slide-type portable terminal device using the same which can overcome the above-described problem are desired.

SUMMARY

An exemplary slide mechanism includes a main plate, a slide plate, and two arched resilient members. The arched resilient members are disposed on the main plate. The slide plate is slidably laid over the main plate. A resisting member is fixed on one surface of the slide plate facing the main plate. The resisting members is set between the two arched resilient members. The resisting member keeps resisting the arched resilient member when the slide plate is sliding on the main plate. A guiding surface is formed on the main plate. One end of the arched resilient member is fixed to the main plate, and the other end of the arched resilient member resists and is slidable along the guiding surface. The resisting member is configured for resisting against and being deformed by the arched resilient member, thus making the end of the arched resilient member contacting the guiding surface sliding along the guiding surface.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present slide mechanism and the slide-type portable terminal device using the same. Moreover, in the drawings, like reference numerals designate corresponding parts throughout the several views.

DETAILED DESCRIPTION OF THE EMBODIMENTS

Figure 1:
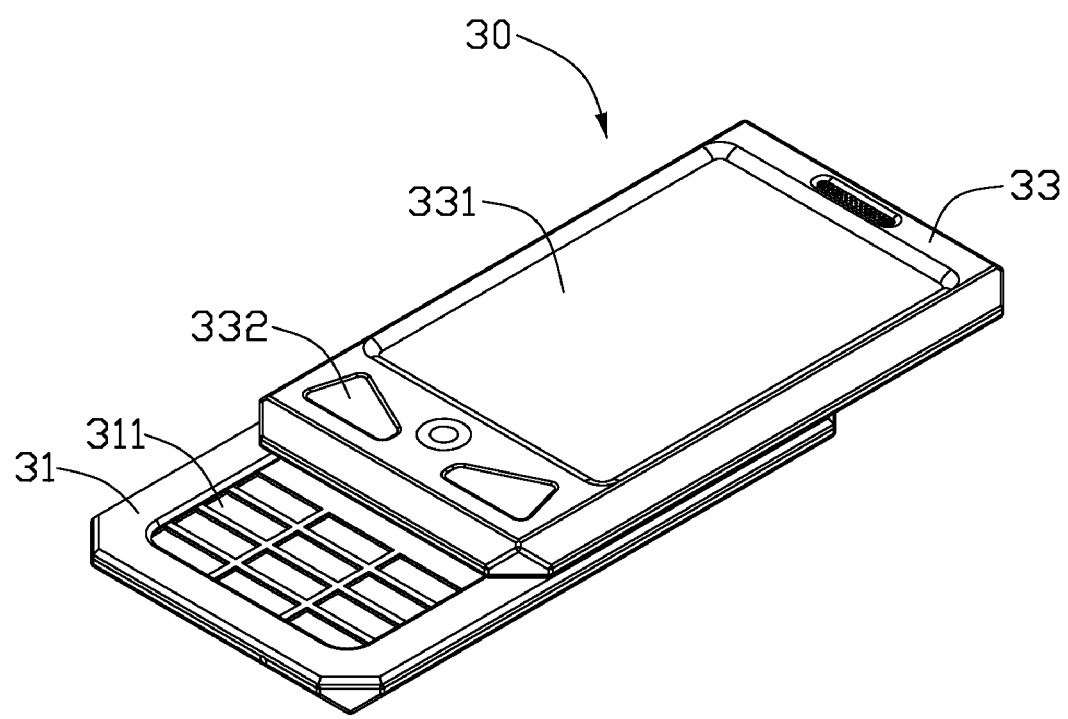
FIG. 1 is an isometric view of a mobile phone in accordance with an exemplary embodiment of the present application.
Figure 2:
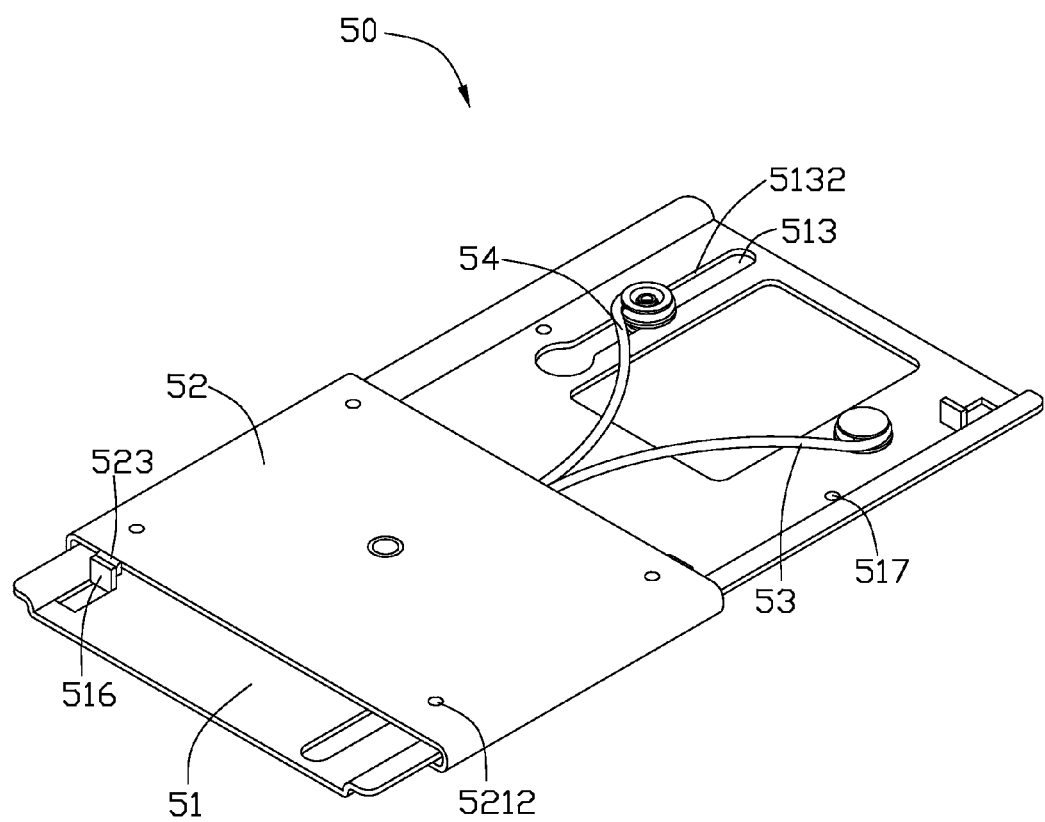
FIG. 2 is an assembled, isometric view of a slide mechanism used in the mobile phone of FIG. 1.

A slide mechanism according to an exemplary embodiment of the present invention is adapted for use in sliding-type portable terminal devices such as a mobile phone 30. Referring to FIGS. 1 and 2, the mobile phone 30 includes a first housing 31, a second housing 33, and a slide mechanism 50. The second housing 33 is engaged with the first housing 31. The slide mechanism 50 is disposed between the first and second housings 31 and 33. The slide mechanism 50 is configured for generating an elastic force sufficient to slide the second housings 33 relative to the first housing between closed and open positions. A top surface of the first housing 31 is configured with a keypad 311. A top surface of the second housing 33 is configured with a display 331 and a plurality of function keys 332. The second housing 33 is slidable over the first housing 31 along a length of the first housing 31, thus exposing or covering the keypad 311.

Figure 3:
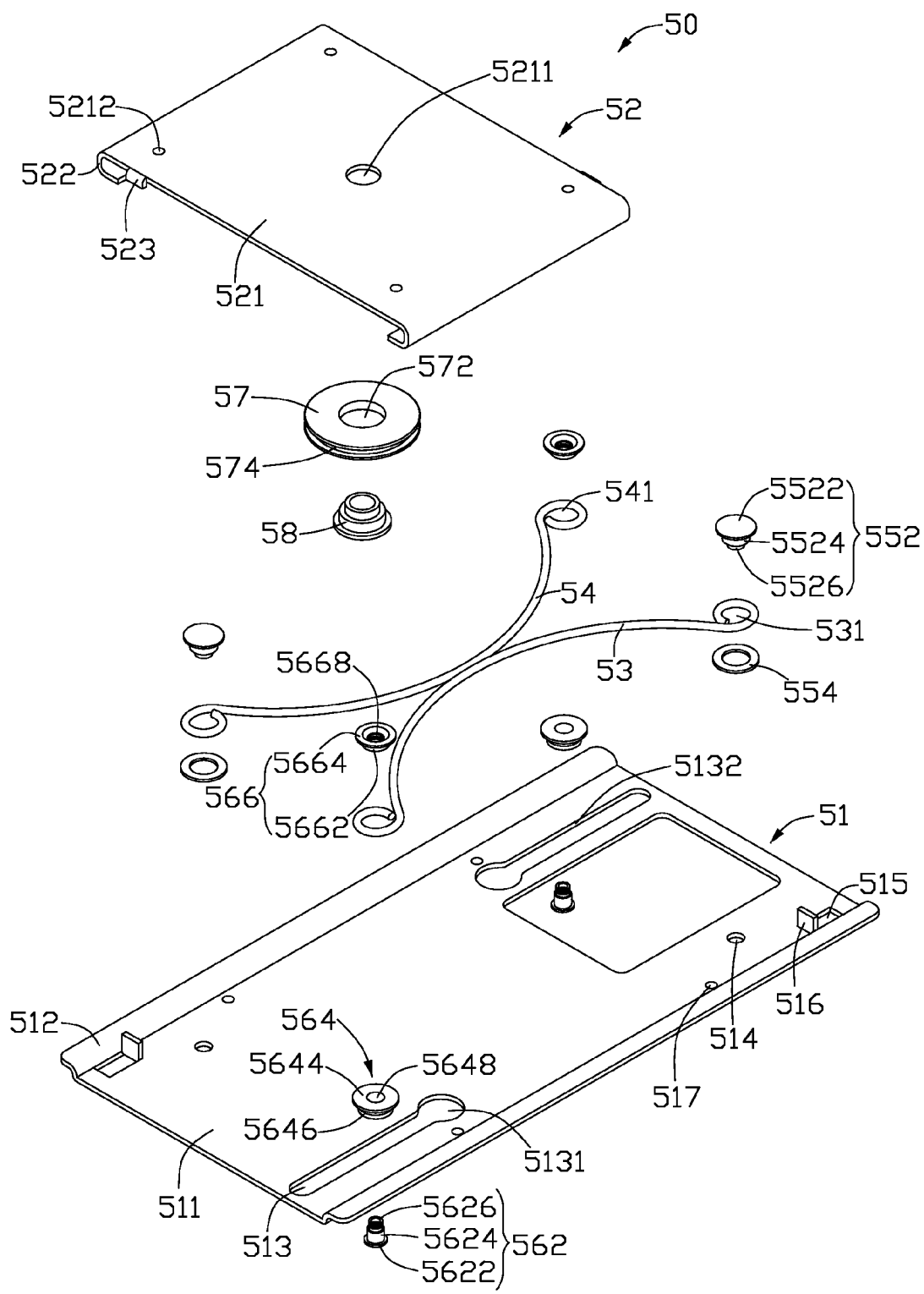
FIG. 3 is an exploded, isometric view of the slide mechanism of FIG. 2.

Referring to FIGS. 1 through 3, the slide mechanism 50 includes a main plate 51, a slide plate 52, a first arched resilient member 53, a second arched resilient member 54, two first connecting subassemblies 55, two second connecting subassemblies 56, a post 57 acting as a resisting member, and a fixing member 58. The main plate 51 and the slide plate 52 are fixed to the first housing 31 and the second housing 33 of the mobile phone 30 correspondingly.

The main plate 51 includes a substantially rectangular flat plate 511 and two guide rails 512 extends on opposite sides of the flat plate 511. A cross-section of each guide rail portion 512 taken along a plane perpendicular to a length of the guide rail portion 512 is L-shaped. The flat plate 511 defines two guiding slots 513 in diagonally opposite corners. An extending direction of the guiding slots 513 is parallel to an extending direction of the guide rails 512. A guiding surface 5132 for resisting the second connecting subassembly 56 is defined at a side surface of the guiding slot 513. The flat plate 511 also defines a receiving hole 5131 communicating with an end of the guiding slot 513 adjacent to the center of the flat plate 511. The diameter of the receiving hole 5131 is larger than the width of the guiding slot 513. The flat plate 511 defines two positioning holes 514 in the other opposite corners. The flat plate 511 also defines two square open holes 515 in opposite corners, adjacent to the positioning holes 514 respectively. A limiting protrusion 516 extends from an edge of each square hole 515. The flat plate 511 defines four first mounting holes 517 at opposite edges, for fixing the main plate 51 to the first housing 31.

A length of the slide plate 52 is smaller than that of the main plate 51. The slide plate 52 includes a base plate 521 and two C-shaped latching portions 522 extended from opposite sides of the base plate 521. The base plate 521 is substantially rectangular shaped, and defines a key hole 5211 in the center thereof. The slide plate 52 defines four second mounting holes 5212 in four corners, for fixing the slide plate 52 to the second housing 33. Two limiting pieces 523 corresponding to the limiting protrusions 516 are formed at opposite corners of the base plate 521, thus defining a sliding range of the slide plate 52 relative to the main plate 51.

Ends of the first and second arched resilient members 53, 54 are curled to form mounting holes 531, 541.

The first connecting subassembly 55 includes a rivet 552 and a washer 554. The rivet 552 includes a rivet cap 5522, a rivet shaft 5524, and a rivet tip 5526 in that order. The rivet 552 is configured for extending through the mounting holes 531, 541 of the first and second arched resilient members 53, 54, and engaging in the positioning holes 514 of the main plate 51.

The second connecting subassembly 56 includes a screw 562, a sliding member 564, and a locking member 566. The screw 562 includes a screw cap 5622, a screw shaft 5624, and a threaded portion 5626. A diameter of the screw cap 5622 is greater than the width of the guiding slot 513. The sliding member 564 includes a shaft portion (not labeled), a first flange 5644, and a second flange 5646. The first flange 5644 and the second flange 5646 extend from opposite ends of the shaft portion correspondingly. Diameters of the first flange 5644 and the second flange 5646 are greater than the width of guiding slot 513, but smaller than the diameter of the receiving hole 5131. The sliding member 564 also defines a pivot hole 5648. A locking member 566 includes a receiving portion 5662 and a flange 5664 extended from one end of the receiving portion 5662. The receiving portion 5662 is configured for extending through the mounting holes 531,541 of the first and second arched resilient members 53, 54. The locking member 566 defines a screw hole 5668 in a center.

The post 57 defines a fixing hole 572 in a center, and an annular groove 574 in a side surface. The fixing member 58 is configured for extending through the fixing hole 572 of the post 57 and being engaged with the slide plate 52.

Referring to FIGS. 1 through 3, in assembly of the slide mechanism 50, the rivet 552 extends through one mounting hole 531 of the first arched resilient member 53, the through hole of the washer 554, one positioning holes 514 of the main plate 51, and then riveted. The screw 562 is extended through the pivot hole 5648 of the sliding member 564, the other mounting hole 531 of the first arched resilient member 53, and screwed into the screw hole 5668 of the locking member 566. The sliding member 564 is received in the guiding slot 513 of the main plate 51. The first flange 5644 and the second flange 5646 resist opposite surfaces of the main plate 51 correspondingly. The shaft portion of the sliding member 564 resists the guiding surface 5132, and is slidable along the guiding surface 5132. The second arched resilient member 54 is assembled to the main plate 51 according to the same assembling steps of the first arched resilient member 53. Then, the first arched resilient member 53 and the second arched resilient member 54 contact each other at a middle portion. The post 57 is fixed to the slide plate 52 by the fixing member 58. The two guide rails 512 of the main plate 51 are received in the two U-shaped latching portions 522 of the slide plate 52 correspondingly. Then, both the first arched resilient member 53 and the second arched resilient member 54 are partially received in the annular groove 574 of the post 57.

After the slide mechanism 50 is assembled, the main plate 51 is fixed to the first housing 31, and the slide plate 52 is fixed to the second housing 33. When the slide plate 52 slides over the main plate 51, the second housing 33 will slide over the first housing 31, thus exposing or covering the keypad 311 of the first housing 31. The post 24 is slidable in a straight line, and a distance between the first resilient member 53 and the straight line gradually increases from the middle to the two ends thereof. A distance between the second resilient member 54 and the straight line also gradually increases from the middle to the two ends thereof.

Figure 4:
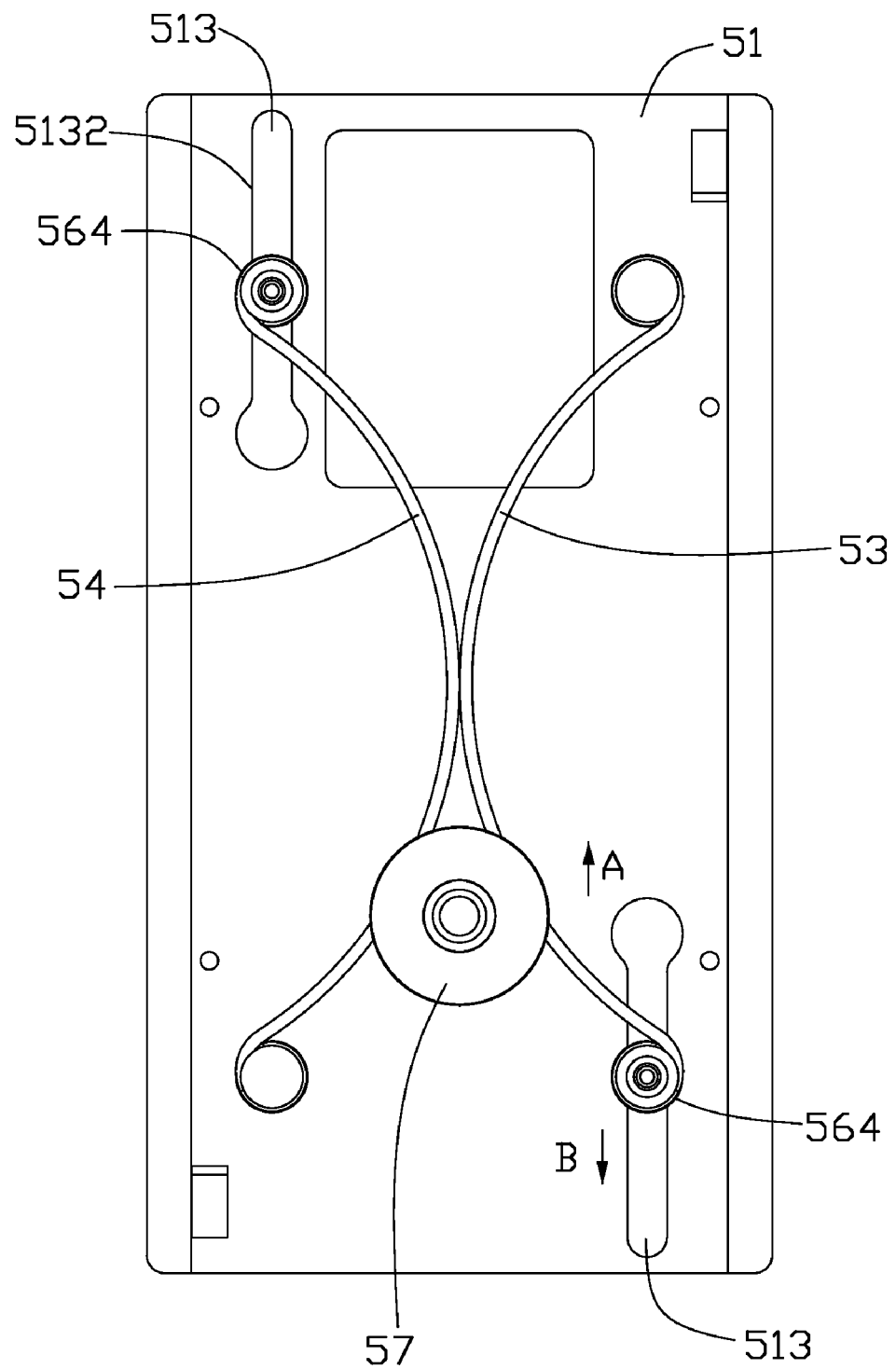
FIG. 4 is a top plane view of the slide mechanism of FIG. 2 showing the slide plate at a closed position relative to the main plate.
Figure 5:
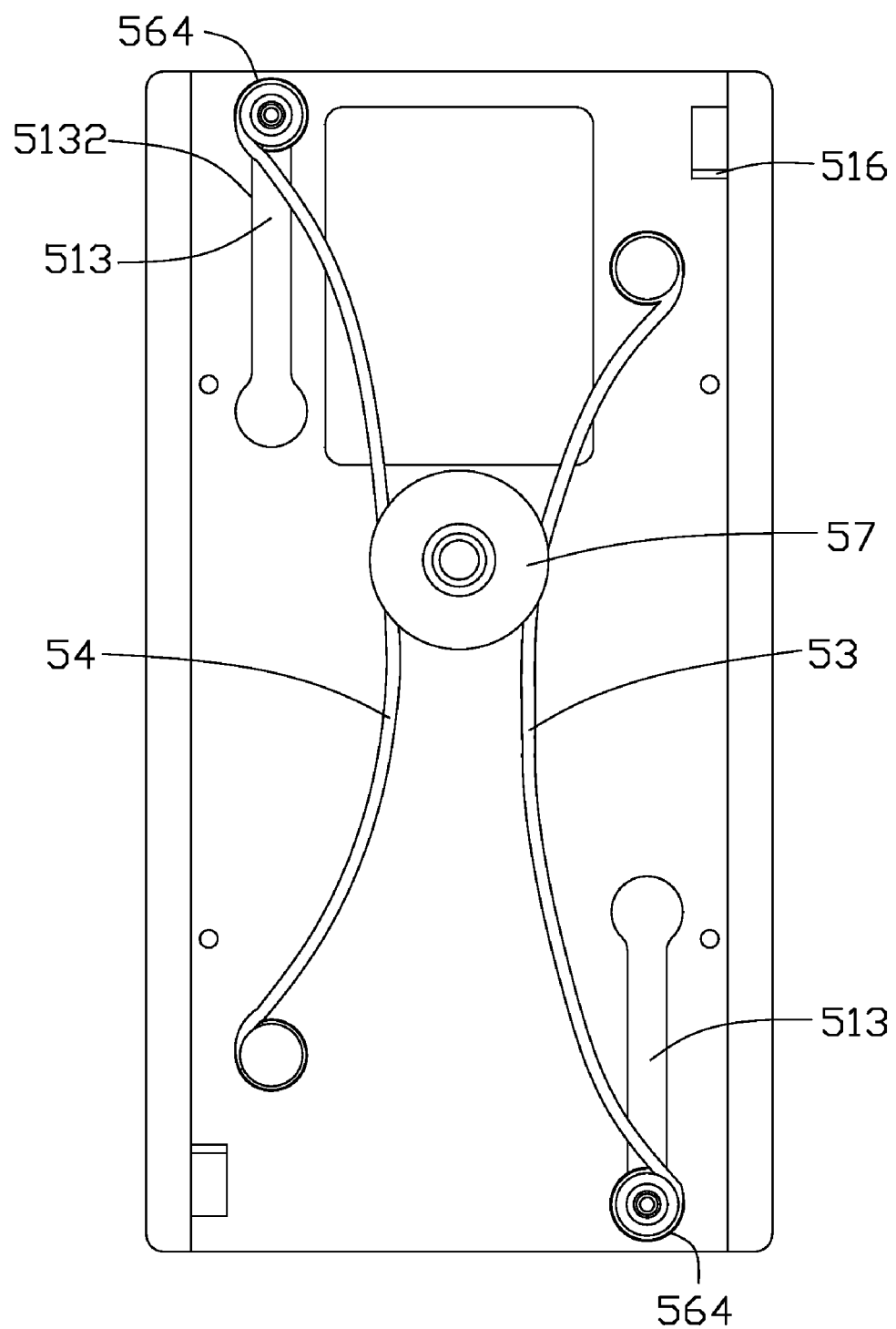
FIG. 5 is a top plane view of the slide mechanism of FIG. 2 showing the slide plate at a half-closed position relative to the main plate.
Figure 6:
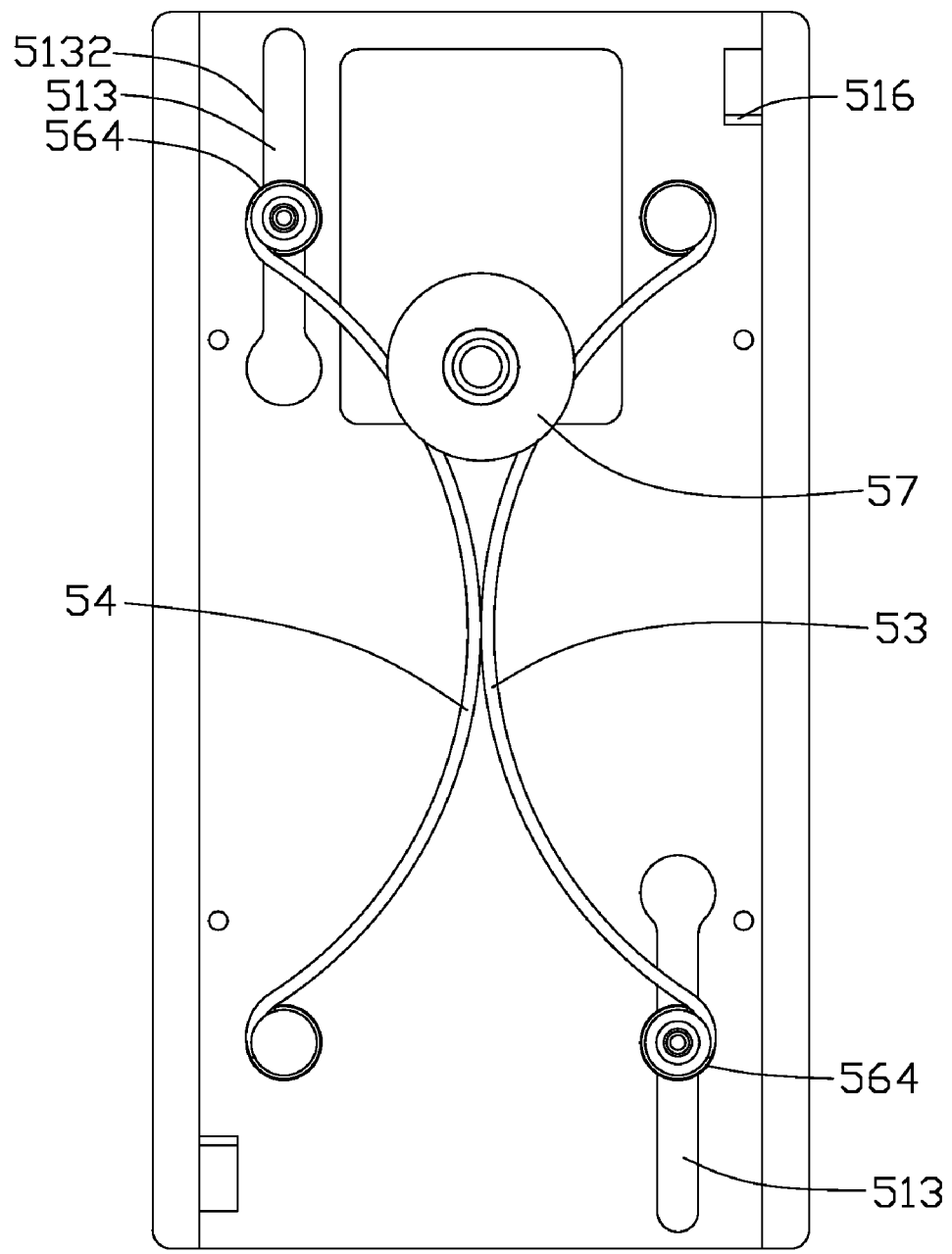
FIG. 6 is a top plane view of the slide mechanism of FIG. 2 showing the slide plate at an open position relative to the main plate.

Referring to FIGS. 4 through 6, when the second housing 33 is pushed in a direction from a closed position to an open position as shown in FIG. 1, to exposed the keypad 311 of the first housing 31, the slide plate 52 is driven to slide relative to the main plate 51 along a direction of the arrow A shown in FIG. 4. The post 57 of the slide plate 52 slides along the direction of the arrow A, and resists the arched resilient members 53 and 54. Then, the arched resilient members 53, 54 deform and store potential elastic energy. At the same time, one sliding member 564 pushed by the first arched resilient member 53 slides in the guiding slot 513 of the main plate 51 along a direction of the arrow B shown in FIG. 4. Another sliding member 564 pushed by the second arched resilient member 54 slides in the guiding slot 513 of the main plate 51 along a direction of the arrow A shown in FIG. 4.

When the post 57 reach a half-opened position shown in FIG. 5, the sliding members 564 slides to an end of the guiding slots 513 opposite to the receiving hole 5131. Both the first arched resilient member 53 and the second arched resilient member 54 have their smallest radian on the main plate 51, thereby storing a maximum resilient energy. Immediately after the slide plate 52 passes the middle of the main plate 51, the slide plate 52 automatically slides under a resilient force of the arched resilient members 53, 54. That is, the second housing 33 automatically slides to the open position of the FIG. 1 driven by the slide plate 52. When the slide plate 52 reaches the open position, the limiting pieces 523 of the slide plate 52 resists the limiting protrusion 516 of the main plate 51. It should be pointed out that, the second housing 33 can automatically slide to a closed position driven by the slide plate 52.

Because ends of the arched resilient members 53, 54 are slidably attached to the main plate 51, the arched resilient members 53, 54 can extend along a length of the main plate 51 when pushed by the post 57. Therefore, the arched resilient members 53, 54 are only partially deformed, thus avoiding losing resilient qualities thereof. That is, the slide mechanism 50 has a long service life. In addition, the second housing 33 semi-automatically slides relative to the first housing 31 between the open and closed positions in response to the elastic force produced by the first arched resilient member 53 and the second arched resilient member 54. Thereby, the mobile phone 30 is convenient to use.

It should be noted that, the slide mechanism 50 may only include one single arched resilient member, provided the post 57 keeps resisting the arched resilient member when the slide plate 52 slides on the main plate 51, in order to make the second housing 33 semi-automatically slide relative to the first housing 31 between the open and closed positions. The first and second arched resilient members 53 and 54 can be other resilient members, but should conform to having a distance between the resilient member and a straight line the post 24 slides gradually increases from the middle to two ends thereof, after the resilient members are assembled on the main plate 51. For example, a resilient member includes two elastic bars intersecting at a point. Furthermore, the two guiding slots 513 are defined at the same end of the main plate 51. The guide rail portion 512 is sleeved with a U-shape resilient member, in order to reduce friction between the first arched resilient member 53 and second arched resilient member 54. The guiding slots 513 of the main plate 51 are replaced by a guiding bar, and a side surface of the guiding bar is a guiding surface. One end of the arched resilient member resists and is slidable along the guiding surface.

Figure 7:
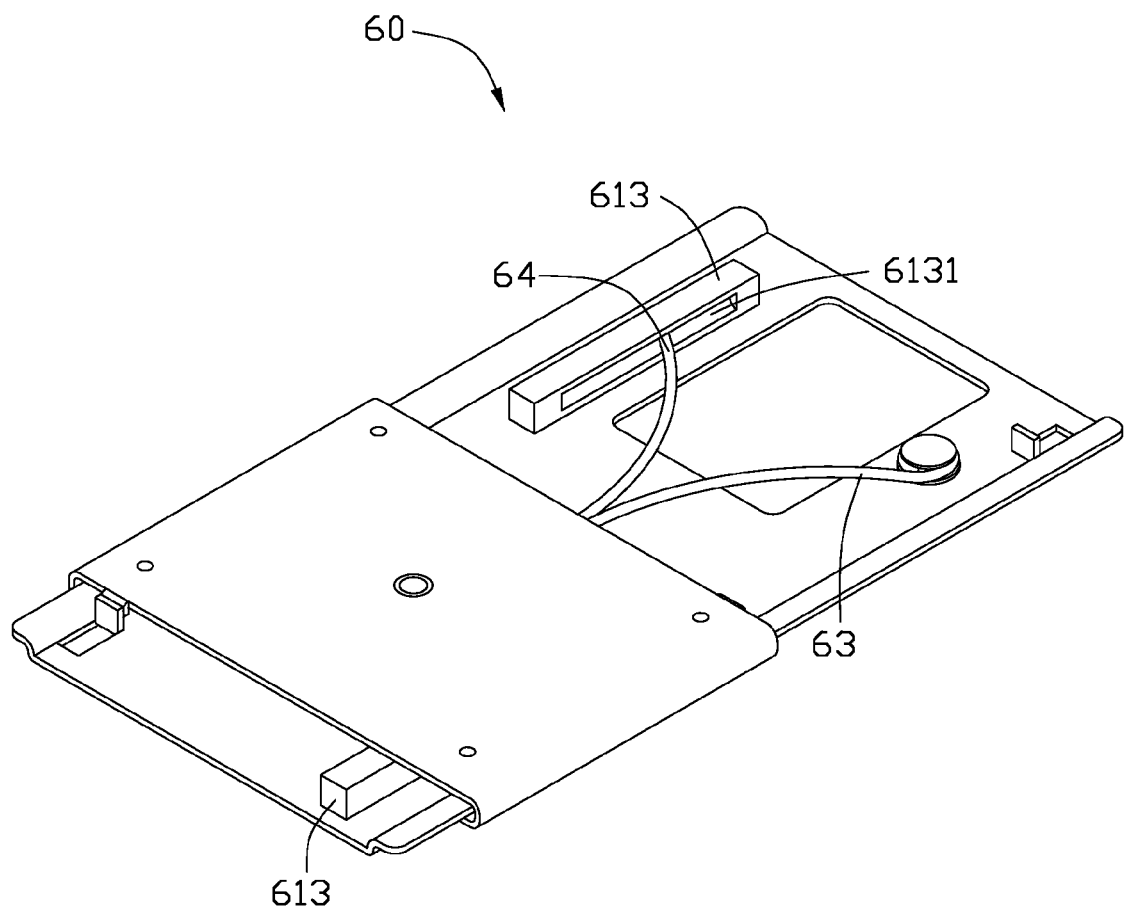
FIG. 7 is an assembled, isometric view of a slide mechanism in accordance with another embodiment of the present application.
Figure 8:
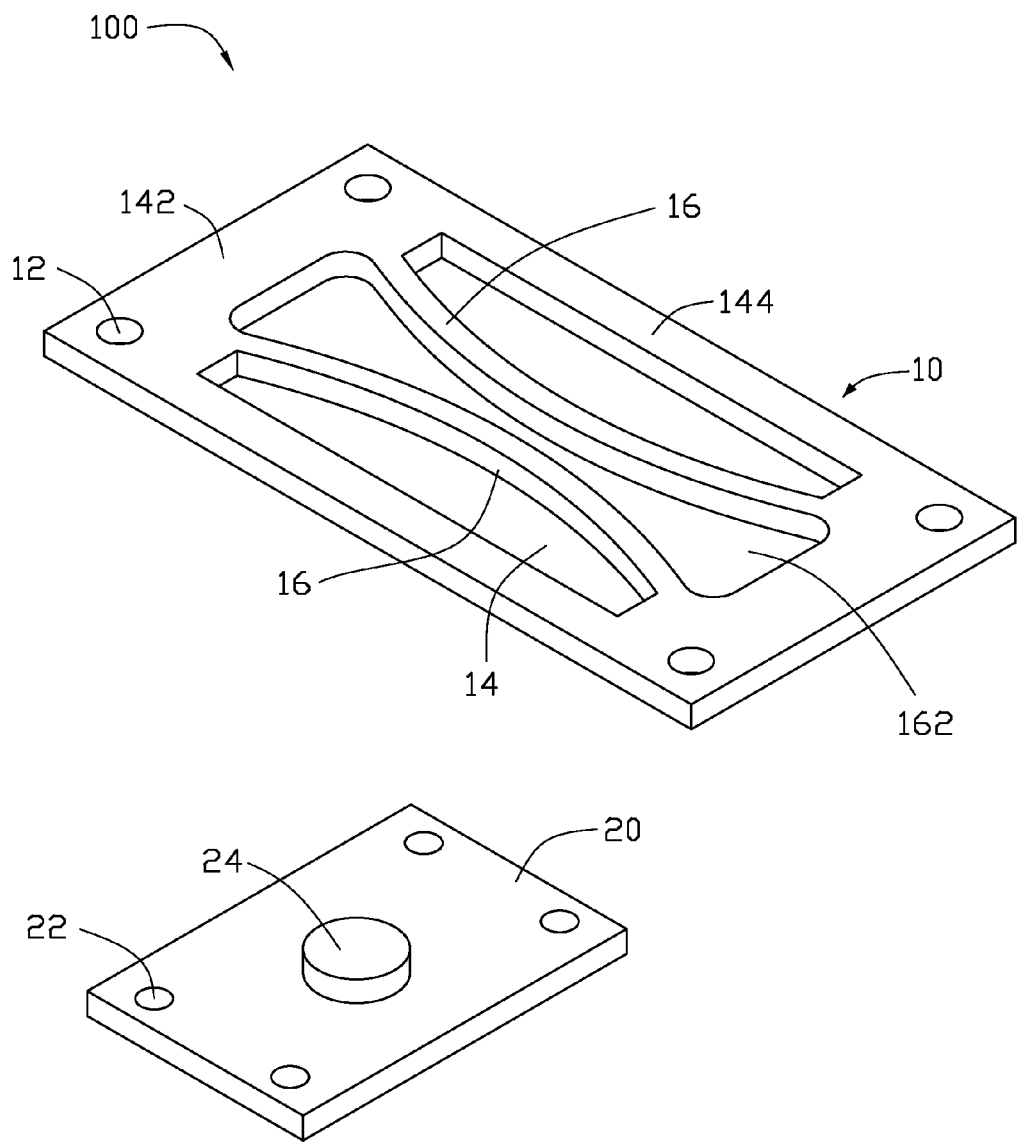
FIG. 8 is an exploded, isometric view of a conventional sliding mechanism.
Figure 9:
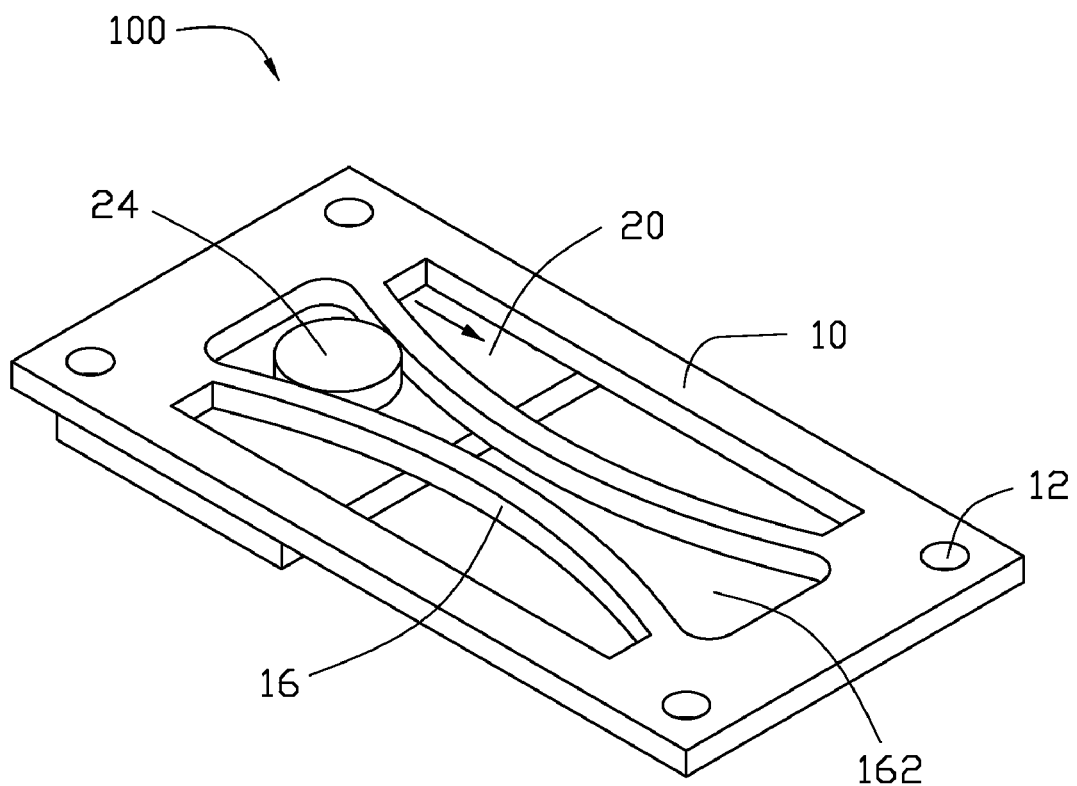
FIG. 9 is an isometric, assembled view of the sliding mechanism of FIG. 7.

Referring to FIG. 7, a slide mechanism 60 in accordance with another embodiment is shown. The slide mechanism 60 is similar in principle to the slide mechanism 50, except that the guiding slot 513 is replaced by a guiding bar 613. The guiding bar 613 defines a groove 6131 in a side thereof. A guiding surface is defined at a side surface of the groove 6131. An end of the first arched resilient members 63 or second arched resilient members 64 is received in the groove 6131. Therefore, ends of the first arched resilient members 63 and the second arched resilient members 64 received in the guiding bar 613 are slidable along the guiding surface.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A slide mechanism, comprising:
a main plate;
at least one arched resilient member disposed on the main plate;
a slide plate slidably laid over the main plate, a resisting member is fixed on one surface of the slide plate facing the main plate, and the resisting member resists the arched resilient member when the slide plate slides on the main plate; and
wherein a guiding surface is formed on the main plate, one end of the arched resilient member is fixed to the main plate, the other end of the arched resilient member resists and is slidable along the guiding surface, and the resisting member is configured for deforming the arched resilient member, thus making the end of the arched resilient member, contacting the guiding surface, slides along the guiding surface; and
wherein the main plate defines at least one guiding slot, the guiding surface is one side surface of the at least one guiding slot; and
wherein the at least one arched resilient member comprises two arched resilient members, the resisting member is set between the two arched resilient members, two guiding slots are defined on opposite sides of the main plate correspondingly, one end of each arched resilient member is fixed to the main plate, and the other end of each arched resilient member is slidably connected to the guiding slots of the main plate.

2. The slide mechanism as claimed in claim 1, wherein at least one guiding bar is formed on the main plate, the guiding bar defines a groove in a side, and a side surface of the groove is the guiding surface.

3. The slide mechanism as claimed in claim 1, wherein the resisting member defines an annular groove in a side surface, the arched resilient member is partially received in the annular groove of the resisting member.

4. The slide mechanism as claimed in claim 1, wherein one end of each arched resilient members is looped to form a mounting hole, the main plate defines two assembling holes in two opposite corners, the slide mechanism further comprises two first connecting subassemblies, a first connecting subassembly extending through the mounting hole of the arched resilient member and an assembling hole of the main plate, in order to fix one end of the arched resilient member to the main plate.

5. The slide mechanism as claimed in claim 4, wherein another end of each arched resilient members is looped to form a mounting hole, two guiding slots are defined in another two opposite corners, the slide mechanism further comprises two second connecting subassemblies, a second connecting subassembly extending through the mounting hole of the arched resilient member and the at least one guiding slot of the main plate, in order to make one end of the arched resilient member slidably connected to the main plate.

6. The slide mechanism as claimed in claim 5, wherein the second connecting subassembly comprises a sliding member having a shaft portion, a first flange and a second flange are respectively extended from opposite ends of the shaft portion, the shaft portion is received in the at least one guiding slot of the main plate, the first flange and the second flange respectively contact opposite surfaces of the main plate.

7. The slide mechanism as claimed in claim 1, wherein two limiting pieces are formed at opposite ends of the slide plate, two limiting protrusions corresponding to the limiting pieces are formed at opposite ends of the main plate, the limiting pieces and the limiting protrusions cooperatively define a largest sliding length of the slide plate relative to the main plate.

8. The slide mechanism as claimed in claim 1, wherein the main plate comprises a flat plate portion and two guide rails extended from opposite sides of the flat plate portion, the slide plate comprises a base plate and two positioning portions extended from opposite sides of the base plate, and the positioning portions are sleeved on the guide rails.

9. A slide-type portable terminal device comprising:
a first housing;
a second housing slidably installed on the first housing; and
a slide mechanism installed between the first housing and the second housing for guiding a sliding motion of the second housing in relation to the first housing, comprising:
a main plate;
at least one arched resilient member disposed on the main plate;
a slide plate slidably laid over the main plate, a resisting member is fixed on one surface of the slide plate facing to the main plate, and the resisting member keeping resisting the arched resilient member when the slide plate sliding on the main plate; and
wherein a guiding surface is formed on the main plate, one end of the arched resilient member is fixed to the main plate, the other end of the arched resilient member resists and is slidable along the guiding surface, and the resisting member is configured for resisting the arched resilient member to be deformed, thus making the end of the arched resilient member contacting the guiding surface slide along the guiding surface; and
wherein the at least one arched resilient member comprises two arched resilient members, the resisting member set between the two arched resilient members, wherein two guiding slots are defined on opposite sides of the main plate correspondingly, one end of each arched resilient member is fixed to the main plate, and the other end of each arched resilient member is slidably connected to the guiding slots of the main plate.

10. The slide-type portable terminal device as claimed in claim 9, wherein the main plate defines at least one guiding slot, the guiding surface is one side surface of the at least one guiding slot.

11. The slide-type portable terminal device as claimed in claim 9, wherein at least one guiding bar is formed on the main plate, the guiding bar defines a groove in a side, and a side surface of the groove is the guiding surface.

12. The slide mechanism as claimed in claim 9, wherein the resisting member defines an annular groove in a side surface, the arched resilient member is partially received in the annular groove of the resisting member.

* * * * *